(12) United States Patent
Albero et al.

(10) Patent No.: US 11,928,135 B2
(45) Date of Patent: Mar. 12, 2024

(54) EDGE COMPUTING DATA REPRODUCTION AND FILTERING GATEKEEPER

(71) Applicant: Bank of America Corporation, Charlotte, NC (US)

(72) Inventors: George Albero, Charlotte, NC (US); Manu Kurian, Dallas, TX (US); Maharaj Mukherjee, Poughkeepsie, NY (US); Morgan S. Allen, Charlotte, NC (US); Naga Vamsi Krishna Akkapeddi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 157 days.

(21) Appl. No.: 17/852,730

(22) Filed: Jun. 29, 2022

(65) Prior Publication Data

US 2024/0004904 A1     Jan. 4, 2024

(51) Int. Cl.
*G06F 16/00*     (2019.01)
*G06F 16/2457*     (2019.01)
*G06F 16/28*     (2019.01)

(52) U.S. Cl.
CPC ...... *G06F 16/285* (2019.01); *G06F 16/24573* (2019.01)

(58) Field of Classification Search
CPC .............................. G06F 16/285; G06F 16/211
USPC .......................................................... 707/737
See application file for complete search history.

(56) References Cited

U.S. PATENT DOCUMENTS

| 2023/0068386 A1* | 3/2023 | Akdeniz | ................ G06N 3/063 707/707 |
| 2023/0176557 A1* | 6/2023 | Cella | .................. G05B 19/4184 700/117 |

* cited by examiner

*Primary Examiner* — Alexandria Y Bromell
(74) *Attorney, Agent, or Firm* — Weiss & Arons LLP

(57) ABSTRACT

A method is provided to reduce the number of duplicates of each document that is stored within entity databases. The method may include creating discrete links and/or pointers to the location of the document already stored within an entity. The method may also include separating the document into different classification levels. The method may include storing the different parts of the documents in different locations within the entity.

19 Claims, 4 Drawing Sheets

EDGE COMPUTING DATA REPRODUCTION AND FILTERING GATEKEEPER

FIELD OF TECHNOLOGY

This application relates to edge computing.

BACKGROUND OF THE DISCLOSURE

Entities may include various sub-entities. Each of the various sub-entities may store copies of documents and/or data elements. At times, there may be a lack of communication between the sub-entities. Because of the lack of communication between the sub-entities, a single document or data element may be stored multiple times within the entity. Duplicative storage of a document and/or data element may result in wasted storage at the entity as well as discrepancies between documents and/or data elements stored at the entity.

As such, it may be desirable to provide a system that identifies a document-to-be-stored. It would be further desirable for the system to determine whether the document-to-be-stored has been previously stored within the entity. The system may prevent re-storing documents that are already stored at the entity. Furthermore, in the event that a document has already been stored, it would be desirable to present the entity with a link or a pointer to where the document has been previously stored.

It would be further desirable to monitor incoming documents at an edge node. When the document is redundant, the system may reduce the document to a pointer or link.

It would be further desirable to filter incoming documents at the edge node. The filtering may classify data included in the document. The data within the document may be classified according to various security levels.

It would be yet further desirable for different parts of the document to be stored in different storage locations. When the different parts of the document are stored in different locations, each of the document parts may classified in a low security classification. However, when the different parts of the document are stored in a single location, the document may be classified in a high security classification. Separating the document into different parts and storing each of the separate parts in different locations may reduce the requirement to classify the stored document in a high security classification. Such a system, implemented on an edge node, may thwart a man-in-the-middle attack by placing the different parts of the document into different locations.

Furthermore, it would be desirable to use metadata to determine popular documents and/or data. Popular documents and/or data may be understood to mean data that is accessed more frequently. Such frequently accessed data may be stored at accessible hubs, thereby reducing processing time to retrieve the frequently accessed data. Furthermore, it may be desirable to identify traffic patterns of data stored in cache memory, within the edge nodes, to further reduce processing times.

SUMMARY OF THE DISCLOSURE

Systems, apparatus, and methods for identifying a document, determining whether the document is included in a repository and storing the document is provided. Methods may include receiving a document at an edge node. The edge node may be included in a network of edge nodes. The network of edge nodes may be linked to the repository. The document may be for storage at the repository. Examples of such documents may be closing documentation for a property purchase, loan documentation for a home equity loan, social security card for a customer, driver's license for a customer, title documentation for a property and any other suitable documents.

Methods may include monitoring the document received at the edge node. The monitoring may include ensuring that duplicate documents are not stored at the repository.

The monitoring may include transmitting a first communication. The first communication may be transmitted from the edge node to the repository. The first communication may include metadata relating to the document. The first communication may be a query. The query may question the repository whether a document that includes the metadata has previously been stored at the repository.

The monitoring may further include a second communication. The repository may transmit the second communication to the edge node. The second communication may include a binary response corresponding to whether the document is stored in the repository. As such, the binary response may indicate whether a document, included in the repository, includes metadata that is similar, over a threshold of similarity, to the metadata included in the first communication. The binary response may indicate that the document is not stored at the repository.

At times, the edge node may instruct the storage of the document in the repository when the binary response indicates that the document is not stored in the repository. Other times, the repository may store the document upon determination that the document is not stored in the repository. As such, the second communication may include a location of where the document was stored.

The binary response may indicate that the document is stored at the repository. If the binary response indicates that the document is already stored at the repository, then the second communication may include an address within the repository that indicates where the document is stored. Furthermore, the edge node may create a discrete link and/or a discrete pointer to the address of the document received by the second communication. The discrete link and/or pointer may only be accessible on the edge node it was created on. The discrete pointer may include metadata. The metadata may include a user that stored the document, a time the document was stored and an edge node identifier that identifies the edge node through which the document was stored.

After receiving the first communication from the edge node, a processor, operating at the repository, may iterate through the files that are stored in the repository. The repository may use the metadata to identify duplicates of the document received at the edge node. If no duplicates are located, then the repository may send a second communication indicating that the document is not stored in the repository. If a duplicate is located, the repository may send a second communication indicating that the document is already stored within the repository.

The data included in the document may be classified according to a plurality of security levels. For example, data that is more secure than a predetermined security standard may be highly classified, while data that is less secure than a predetermined security standard may be less classified.

The classified document may be separated into a plurality of parts based on classification level. As such, the highly classified data may be separated into one part of the document and the data that is less classified may be separated into another part of the document.

The plurality of parts of the document may be stored at different locations at the edge node and/or repository. Because the information may only be highly classified when it is stored at one common location, storing the different parts of the document at different locations may prevent the need to highly classify documents. This may also prevent man-in-the-middle attacks because the data is not stored in one common location.

Metadata of the document may be used to measure a popularity usage metric of the data included in the document. The metadata of the data within the document may be analyzed to indicate how frequently the data is accessed within a predetermined timeframe. Data that is accessed more than a predetermined number of times within a predetermined timeframe may have a high popularity usage metric, while data that is accessed less than a predetermined number of times within a predetermined timeframe may have a low popularity usage metric.

Data that has a high popularity usage metric may be stored within a plurality of accessible hubs at the edge node and/or repository. Data that has a low popularity usage metric may be stored within a plurality of archive hubs at the edge node and/or repository.

A document stored at the edge node and/or repository may be retrieved when the document is requested. The various parts of the document may be retrieved from a plurality of storage locations within the repository and/or edge node in order to recreate the document. For example, a document may include highly classified data and data that is less classified. The highly classified data may be accessed less than a predetermined number of times within a predetermined timeframe. Therefore, the highly classified data may be stored in an archive hub at the edge node and/or repository. The less classified data may be accessed more than a predetermined number of times within a predetermined timeframe and may therefore be stored in an accessible hub at the edge node and/or repository. When the document is requested, the edge node may retrieve the highly classified data from the archive hub and the less classified data from the accessible hub and combine them to recreate the document.

Metrics may be used to analyze the traffic pattern of a plurality of documents within the edge node network and/or repository. Traffic pattern metrics may be used to identify locations that are accessible to a user with less than a predetermined complexity level and location that are accessible to a user with greater than a predetermined complexity level. Locations that are determined to be accessible with less than the predetermined complexity level may be identified as accessible hubs. Locations that are determined to be accessed with greater than the predetermined complexity level may be identified as archive hubs.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
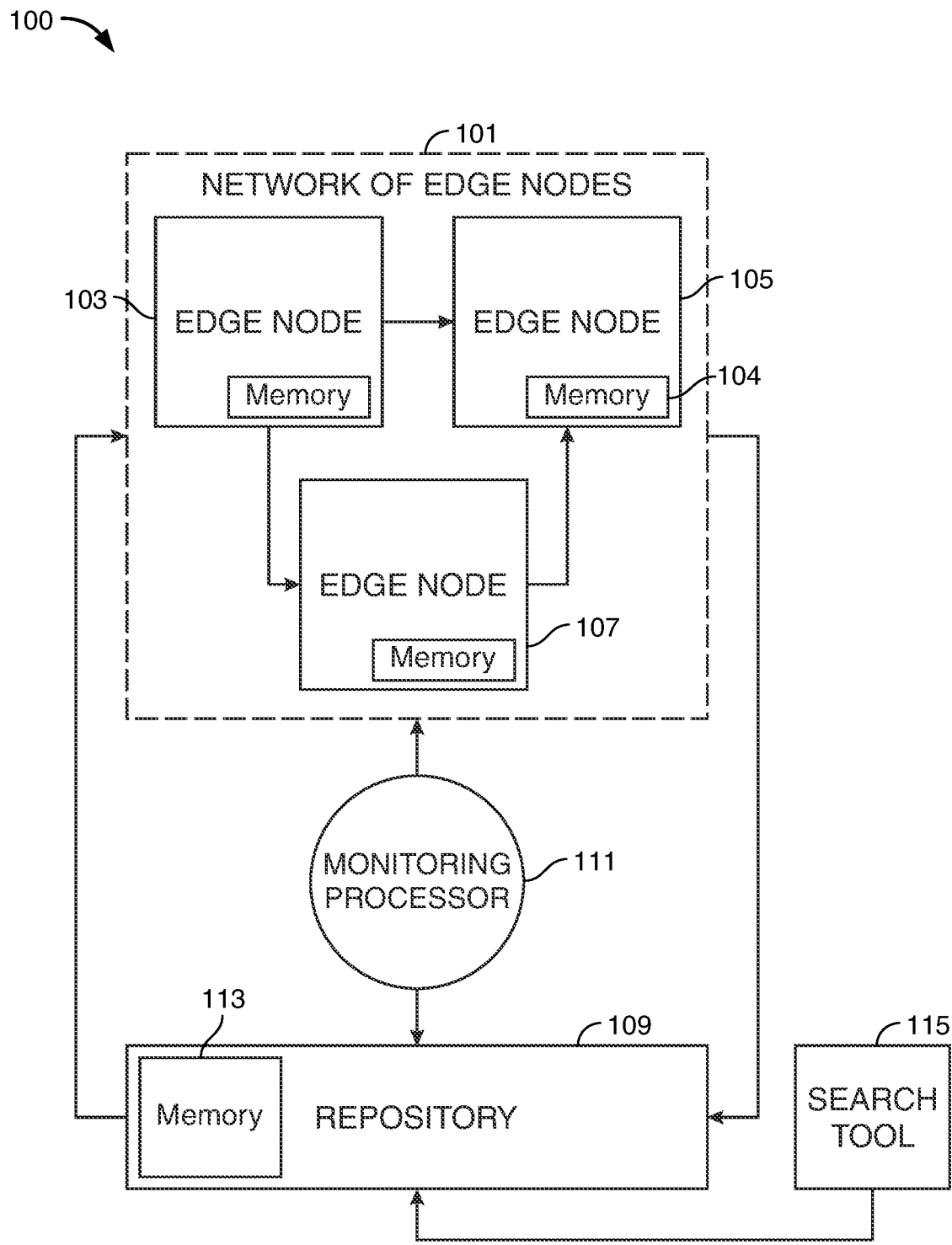
FIG. 1 shows an illustrative diagram in accordance with principles of the invention.

Apparatus, methods and systems for an edge computing data reproduction and filtering gatekeeper is provided.

An apparatus may include a network of one or more edge nodes. The one or more edge nodes may be linked to a repository, a monitoring processor and/or a search tool. Each of the one or more edge nodes may be a desktop, laptop, tablet, smart phone, or any other suitable computing device. When a document is received at an edge node, the monitoring processor may facilitate communications between the edge node and the repository. As such, the monitoring processor may transmit and receive communications between the edge node and the repository. The communications may include a first communication and a second communication.

A document may be received by one of the edge nodes included in the network of edge nodes. Prior to storing the document, the monitoring processor may transmit a first communication from the edge node to the repository. The first communication may include document metadata relating to the document. Such document metadata may include name of the document, date of the document and any other suitable details relating to the document. The monitoring processor may receive the first communication.

The search tool may be operable to iterate through the documents stored at the repository to find any duplicates of the document received by the edge node. If the search finds a duplicate of the document, the search tool may obtain metadata relating to the location of the duplicate document.

The monitoring processor may also transmit a second communication from the repository to the edge node. The second communication may include a binary response to the first communication. The binary response may indicate whether or not the document was previously stored at the repository.

The repository may include a memory drive. The memory drive may hold the stored data within the repository. The memory drive may include one or more accessible hubs and one or more archive hubs.

The edge node may also include a memory drive. The memory drive may hold the stored data within the edge node. The memory drive may also include one or more accessible hubs and one or more archive hubs.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows illustrative apparatus 100. Apparatus 100 may include network of edge nodes 101. Network of edge nodes 101 may include one or more edge nodes. Network of edge nodes 101 may include individual edge nodes 103, 105, and 107. Each individual edge node may be a desktop, laptop, tablet, smart phone, or any other suitable computing device. Each edge node may include memory drive 104. Memory drive 104 may store documents received by the edge node.

Apparatus 100 may also include repository 109. Monitoring processor 111 may enable communication between network of edge nodes 101 and repository 109.

Monitoring processor 111 may transmit and receive messages to and from edge nodes 103, 105 and 107 and repository 109. As such, monitoring processor 111 may transmit a first communication from edge node 101 to repository 109. The first communication may include metadata relating to a specific document. Monitoring processor 111 may transmit a response from repository 109 to edge node 101. The response may be a binary response. The binary response may indicate whether the document is already stored within the repository. In the event that the document is stored in the repository the response may also include an address corresponding to a storage location of the document.

Repository 109 may include memory drive 113. Memory drive 113 may contain the documents that are saved within repository 109. Search tool 115 may be used to search and/or iterate through the documents stored within memory drive 113 to identify whether a specific document is stored within memory 113.

Figure 2:
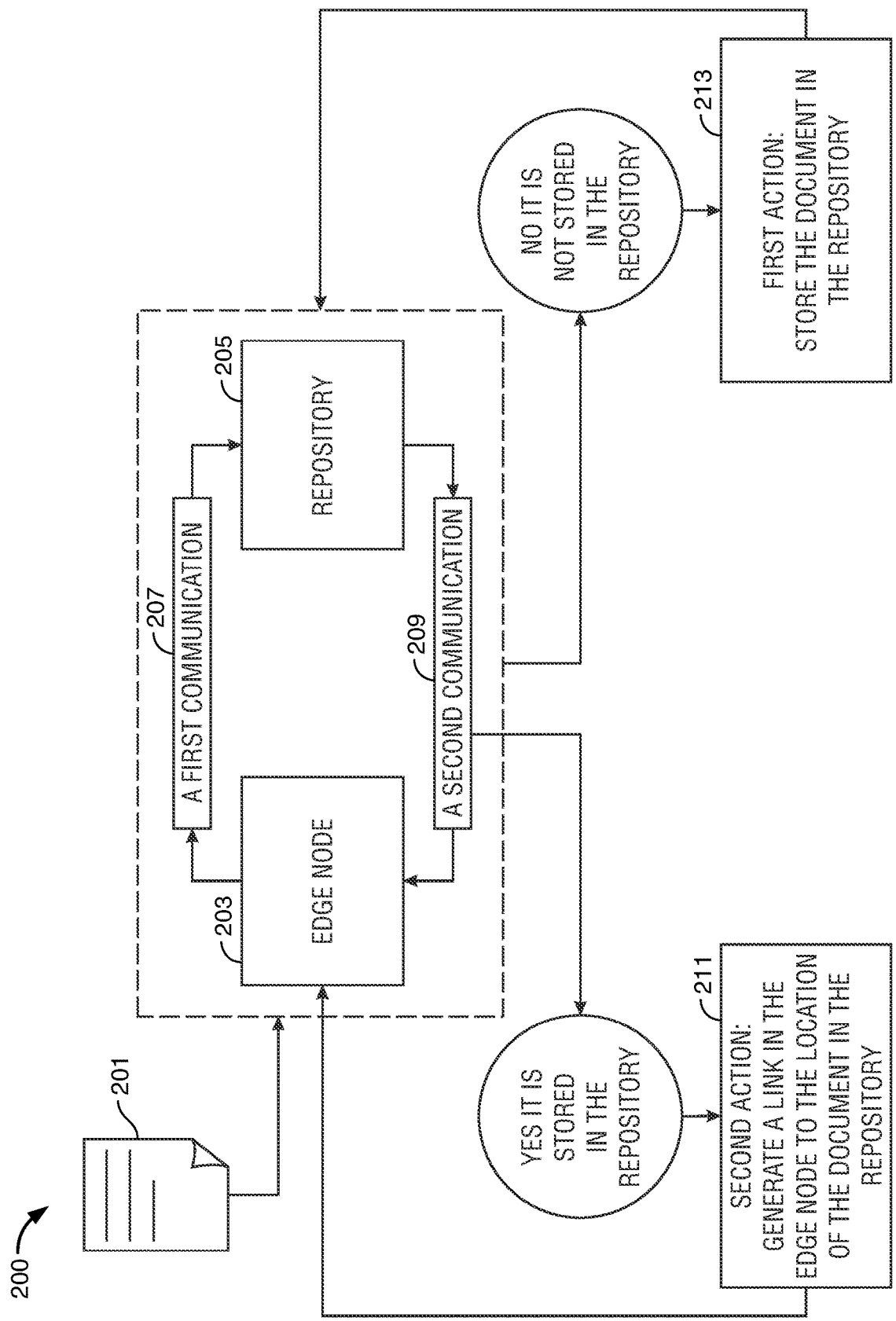
FIG. 2 shows another illustrative diagram in accordance with principles of the invention.

FIG. 2 shows illustrative diagram 200. Illustrative diagram 200 may show the process of various systems components. Document 201 may be received at edge node 203. Document 201 may be received using an electronic medium, such as email, scan, or fax. Upon receiving document 201, edge node 203 may send first communication 207 to repository 205. First communication 207 may include metadata of document 201.

Upon receiving first communication 207, repository 205 may send second communication 209 to edge node 203. Second communication 209 may include a binary response. The binary response may identify whether document 201 is already stored within repository 205. The binary response may identify that document 201 is or is not stored in repository 205. As such, repository 205 may send second communication, including the binary response, indicating that document 201 is or is not stored in repository 205, to edge node 203.

Edge node 203 may receive second communication 209. Based on the binary response included in second communication 209, edge node 203 may process an executable. In the event that document 201 is not stored in repository 205, edge node 203 may store the document in the repository, as shown at 213. In the event that document 201 is stored in repository 205, the edge node may generate a link/pointer to the location of the document in the repository.

Figure 3:
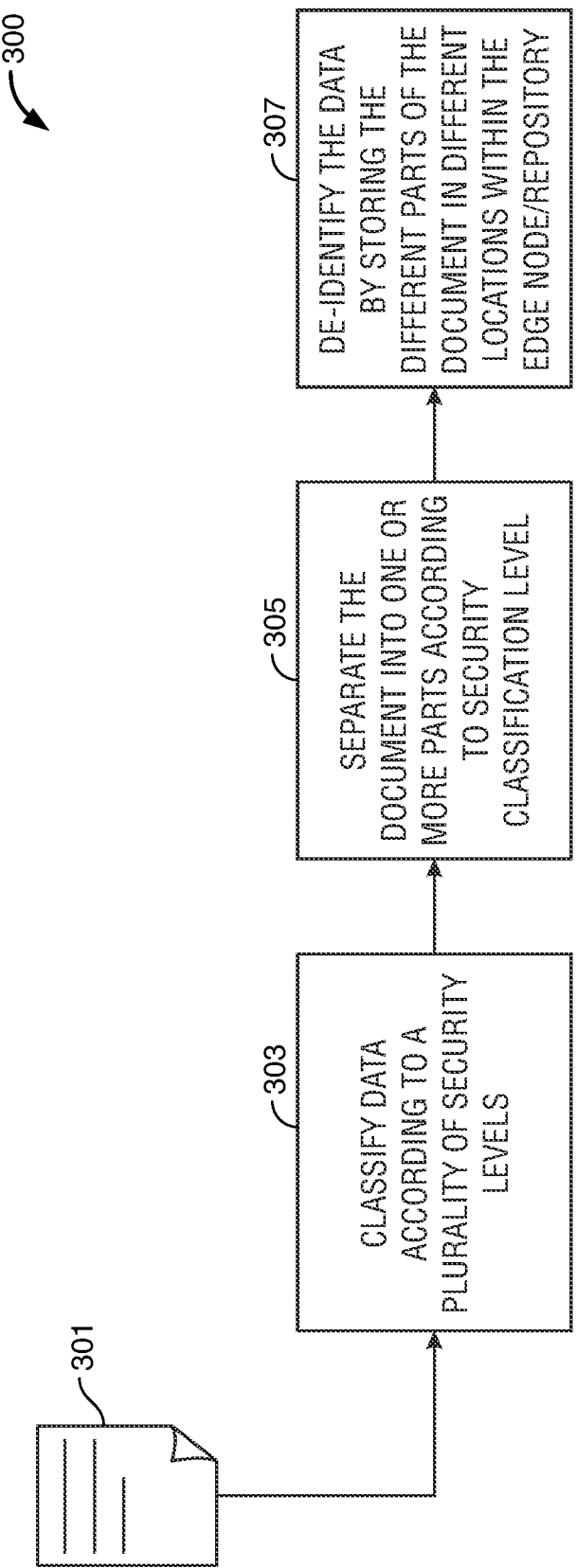
FIG. 3 shows yet another illustrative diagram in accordance with principles of the invention.

FIG. 3 shows illustrative diagram 300. Illustrative diagram 300 shows a process for data classification. Step 303 shows classification of different parts of document 301 according to a plurality of security levels. Upon receipt of document 301 at the edge node, the edge node may analyze the data included in the document. Once the data is analyzed, the data found in document 301 may be classified according to a plurality of security levels.

Step 305 shows that document 301 is separated into one or more parts according to the security classification level determined in step 303. Document 301 may be separated into different parts once the data included in document 301 is analyzed and classified according to the security levels. The separation of document 301 into different parts may be determined based on the security classification level. As such, each block of data may correspond to security classification level.

Step 307 shows de-identifying the data in document 301 by storing the different parts of the document in different locations within the edge node or repository. Once document 301 is separated into different parts, each of the different parts may be stored in different locations, as shown at step 307.

Figure 4:
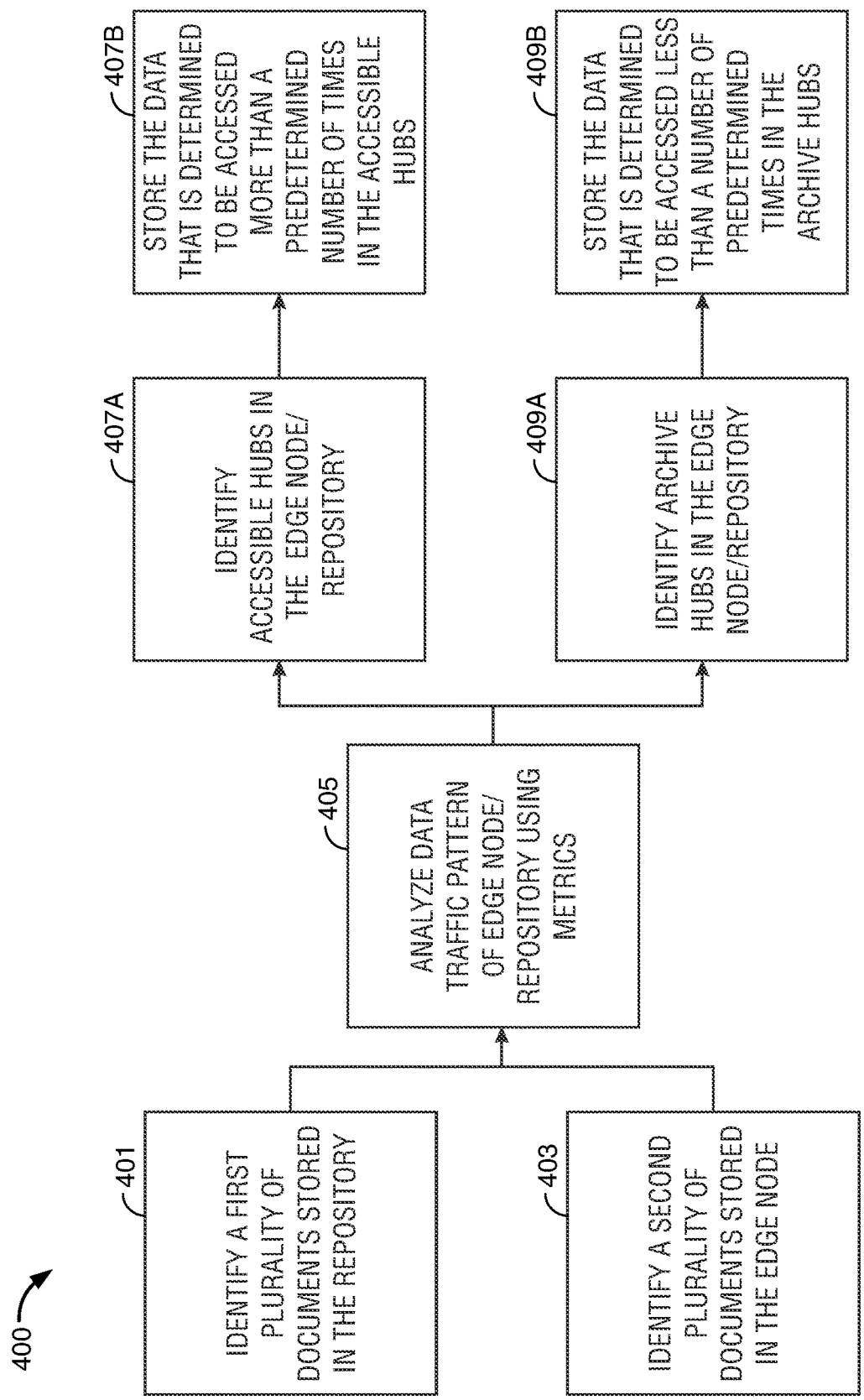
FIG. 4 shows still another illustrative diagram in accordance with principles of the invention.

FIG. 4 shows illustrative diagram 400. Illustrative diagram 400 shows a process for identifying different hubs within the memory drives for data storage.

Step 401 may include identifying a plurality of documents that are stored in the repository. Step 403 may include identifying a plurality of documents that are stored at the edge node. Step 405 may include analyzing data traffic patterns based on the data identified in steps 401 and 403. The analysis may utilize one or more metrics. The metrics may include a frequency metric of the access of a data element, a confidentiality metric of the data element and a rate of response.

Step 407A may include identifying accessible hubs within the memory of the edge node and the repository. Step 407A may include identifying which hubs are accessible at greater than a predetermined ease of access rate. A predetermined ease of access rate may be understood to mean the rate of response in which a hub can provide a response within a predetermined time period. The identifying may utilize the data traffic patterns analyzed in step 405. Step 407B may include storing documents that are determined to be accessed more than a predetermined number of times.

Step 408A may include identifying archive hubs within the memory of the edge node and the repository. Step 409A may include identifying which hubs are determined to involve less than a predetermined ease of access rate. These hubs may be identified as archive hubs. The identification of the archive hubs may be based, at least in part, on the data traffic patterns analyzed in step 405. Step 409B may include storing the documents that are determined to be accessed less than a predetermined number of times. Documents that are determined to be accessed less than predetermined number of times may be stored within the archive hubs. Documents that are accessed more than a predetermined number of times may be stored within the accessible hubs.

What is claimed is:

1. A method for identifying a document in order to store the document as a singular document in a repository, the method comprising:
   receiving a document at an edge node, the edge node is located along a periphery network of edge nodes, the network of edge nodes associated with the repository, said document for storage at the repository;
   monitoring the document received at the edge node, said monitoring comprising:

transmitting, from the edge node to the repository, a first communication comprising metadata relating to the document;
receiving, at the edge node from the repository, a second communication comprising, the second communication comprising:
a binary response corresponding to whether the document is stored at the repository, to the extent the document exists in the repository; and
an address within the repository that indicates where the document is stored within the repository;
storing the document at the repository when the binary response indicates that the document has not been previously stored at the repository;
preventing the edge node from storing the document at the repository when the binary response indicates that the document is stored at the repository; and
enabling the edge node to generate a discrete link and/or a discrete pointer to the address within the repository.

2. The method of claim 1 further comprising creating a link and/or pointer, that is discrete to the edge node at which the link and/or pointer was created, said link and/or pointer comprises:
metadata relating to a said link and/or pointer user that sent in the document, a date the document was sent and a time stamp that the link and/or pointer was created for the document.

3. The method of claim 1, further comprising, iterating, by the repository, through a plurality of metadata records stored at the repository to determine whether the document is stored within the repository.

4. The method of claim 1, further comprising, classifying data included within the document, according to a plurality of security levels.

5. The method of claim 4, further comprising, separating the document into a plurality of parts based on the classifying the data, each of the plurality of parts corresponding to one of the plurality of security levels.

6. The method of claim 5, further comprising, reducing the security level of the document by storing each of the plurality of parts at a distinct location within the edge node and/or the repository.

7. The method of claim 6, further comprising using metadata of the document to classify a popularity usage metric of the data included within the document, said popularity usage metric identifying a frequency of usage of the data.

8. The method of claim 7, further comprising:
Using the popularity usage metric to separate data that is determined to be accessed more than predetermined number of times within a predetermined time window, and data that is determined to be used less than a predetermined number of times within a predetermined time window, and;
storing data, within the document, that is determined to be accessed at more than a predetermined number of times within a predetermined time window, within a plurality of accessible hubs at the edge node and/or repository; and
storing data, within the document, that is determined to be accessed at less than the predetermined number of times within the predetermined time window, in a plurality of archive hubs at the edge node, reducing processing time to retrieve commonly used data.

9. The method of claim 8, further comprising, upon request for the document, retrieving the document from the edge node, wherein all parts of the document are retrieved from the plurality of accessible hubs and the plurality of archive hubs and combined to recreate the document.

10. The method of claim 7, further comprising:
identifying a first plurality of documents stored in the repository;
identifying a second plurality of documents stored in the edge node; and
determining one or more metrics associated with the first plurality of documents and the second plurality of documents to determine data traffic patterns of the data included in the first plurality of documents and the second plurality of documents.

11. The method of claim 10, further comprising, using the one or more data traffic patterns to identify storage locations that are accessible at less than a predetermined complexity level.

12. An apparatus comprising:
An edge node network, said edge node network comprising one or more edge nodes, the edge node network linked to a repository;
the one or more edge nodes, each of the one or more edge nodes comprising a hardware processor and a hardware memory, each of the one or more edge nodes operable to:
receive one or more documents from a source external to the edge node network;
transmit the one or more documents to a prespecified storage location within the repository;
the repository comprising a hardware processor and a hardware memory, said repository operable to:
receive the one or more documents from the one or more edge nodes; and
store the one or more documents in a prespecified location within the repository;
a monitoring processor operable to:
transmit a first communication from one or more of the edge nodes to the repository, the first communication comprising metadata of the document;
transmit a second communication from the repository to the one or more edge nodes, the second communication comprising:
a binary response corresponding to whether the one or more documents are stored in the repository, to the extent the document exists in the repository; and
an address within the repository that corresponds to the prespecified location that indicates where the document is stored within the repository.

13. The apparatus of claim 12, further comprising a search tool operable to:
iterate through the repository;
obtain metadata about the prespecified location of the storage of the one or more documents.

14. The apparatus of claim 12, further comprising a search tool operable to:
receive, from a first edge node, a first document for storage within the repository;
iterate through the repository to identify a duplicate of the first document for storage within the repository;
obtain metadata about the prespecified location of the storage of the first document; and
return the prespecified location of the storage of the first document to the first edge node.

15. The apparatus of claim 12, wherein:
the one or more edge nodes are a network of connected devices; and data accessible at one edge node, included in the network, is accessible at the other edge nodes included in the network.

16. The apparatus of claim 12, wherein the repository further comprises memory drive, said memory device operable to store received data.

17. The apparatus of claim 16, wherein the memory drive further comprises accessible hubs and archive hubs.

18. The apparatus of claim 12, wherein each edge node further comprising a memory drive, each memory drive operable to store received data.

19. The apparatus of claim 18, wherein the memory drive further comprises accessible hubs and archive hubs.

* * * * *